Oct. 20, 1970     J. R. LANCE ET AL     3,534,409

IMPLANTABLE CIRCULATORY SUPPORT SYSTEM

Filed June 10, 1968     3 Sheets-Sheet 3

INVENTORS.
JOSEPH R. LANCE
RICHARD K. DISNEY
ALLEN SELZ
PETER O. TAUSON

United States Patent Office 3,534,409
Patented Oct. 20, 1970

3,534,409
IMPLANTABLE CIRCULATORY SUPPORT SYSTEM
Joseph R. Lance, Irwin, Richard K. Disney and Allen Selz, Pittsburgh, and Peter O. Tauson, Bradford Woods, Pa., assignors, by mesne assignments, to the United States of America as represented by the United States Atomic Energy Commission
Filed June 10, 1968, Ser. No. 735,726
Int. Cl. A61f 1/24
U.S. Cl. 3—1                                8 Claims

ABSTRACT OF THE DISCLOSURE

An implantable circulatory support system incorporating a steam power conversion loop utilizing an isotopic heat source, a steam engine and a hydraulic power transmission loop for utilizing engine shaft power to operate a replacement blood pump. Heat is rejected to the blood of the donee while the power transmission loop provides water make up for the conversion loop.

BACKGROUND OF THE INVENTION

Of the more than 10 million of the population of this country having some form of heart disease, over 500,000 persons die each year from this disorder. Of these it is estimated that upwards of 200,000 persons per year could be helped to have their productive years reinstated or lengthened if there were available a prosthetic circulatory support system employing either an assist or a total replacement blood pump.

In recent years, externally powered blood pumps have been used successfully during heart surgery and the recovery period, so that modern technology is capable of producing the elements of such a prosthetic device provided problems concerning size and weight limitations, heat rejection, and psychological barriers can be resolved over a long period of implantation.

For example, the blood hydraulic pumping power required for total heart replacement devices ranges up to about 6.0 watts which must be provided by a suitable long life power source completely self-contained and preferably implanted within the human body to avoid psychological and sanitary complications arising out of passing transmission lines through the body tissue wall. The constraints imposed by such a requirement are imposing and include limitations as to volume and weight, and additionally, the necessity of rejecting unused heat entirely within the recipient's body.

SUMMARY OF THE INVENTION

The invention described herein was made in the course of, or under a contract with the U.S. Atomic Energy Commission.

The present invention makes it possible for the first time based upon existing technology to provide an implatable circulatory support system for a living mammalian organism capable of meeting the demands of such a system within the constraints imposed.

In accordance with this invention, the prosthetic device relies on an isotopic source of heat, a primary two phase fluid power generation system, a secondary system utilizing the same fluid to energize a replacement blood pump; and a heat rejection system which relies on the recipient's own body as heat sink and heat rejection mechanism. Important features of the invention include relatively low temperature power conversion and transmission systems of improved efficiency and reliability which reduce drastically the problems of heat rejection within the body itself.

The power generation system, which includes a rotary expansion steam engine, is superior to alternative energy converters such as thermoelectric and thermionic converters which generally require relatively high temperatures and produce an electrical power output which introduces an additional conversion step. In this invention, adequate multiphase fluid for power conversion is produced in the source by a single pass preheater and boiler tube which provides stable flow and gravitational insensitivity.

For power conversion, a preferred embodiment of this invention utilizes a positive displacement Rankine cycle using water as working fluid. In order to avoid the considerable disadvantages associated with a reciprocating engine, a rotating piston engine is utilized which because of the low peak temperatures involved permits the use of dry lubricants for the rubbing parts and bearings. This type of positive displacement engine is uniquely suitable for this application because it has a continuously open exhaust which eliminates the problem of destructive action of trapped vapor, permitting the use of wet steam. Such use also makes it possible to expand the steam into the wet region representing an additional energy recovery bonus in the form of latent heat as well as that of sensible heat. This has the additional advantage of utilizing the wet steam to seal and lubricate the sides of the cylinders and thus avoiding use of a separate lubricating system.

The replacement blood pump is energized hydraulically by water under pressure which is developed in a pump driven by the power converter. Thus the power transmission utilizes the same fluid, water, as in the power converter so that it is feasible to use the power transmission loop to transfer heat to be rejected from the steam engine condenser to the blood supply of the recipient.

In addition to the constraints noted, this invention is capable of meeting certain operational limitations. It is designed to meet blood hydraulic power requirements varying from 0.8–1.7 watts during sleeping hours to a short duration peak power of 6.2 watts for stair climbing or similar high exercise level tasks. This invention is also designed to reject all nonused heat to the blood of the recipient and to rely on the body heat dissipation mechanism to transport the heat to the body surface where it can be dissipated to the atmosphere by convection and evaporative cooling (perspiration). It is known that the human body is capable of eliminating heat by maximum perspiration at rates exceeding 1000 watts and that the body has a basal heat dissipation of 85–100 watts. In contrast, this invention rejects less than 50 watts of unused heat to the blood. To accomplish this requires the use of blood heat exchangers within the body, and since studies indicate that clotting and subsequent thrombosis and denaturation of proteins occurs when blood temperatures become excessive, it is essential to limit wall-to-blood interface temperatures within the heat exchangers to safe values. A novel thermal buffering arrangement in this invention successfully accomplishes this result.

It is thus a principal object of this invention to provide an implantable circulatory support system capable of reliable long term utilization.

Other objects and advantages of this invention will become readily apparent from the following description of a preferred embodiment of this invention described with reference to the accompanying drawings.

DESCRIPTION OF THE PREFERRED EMBODIMENT

Figure 1:
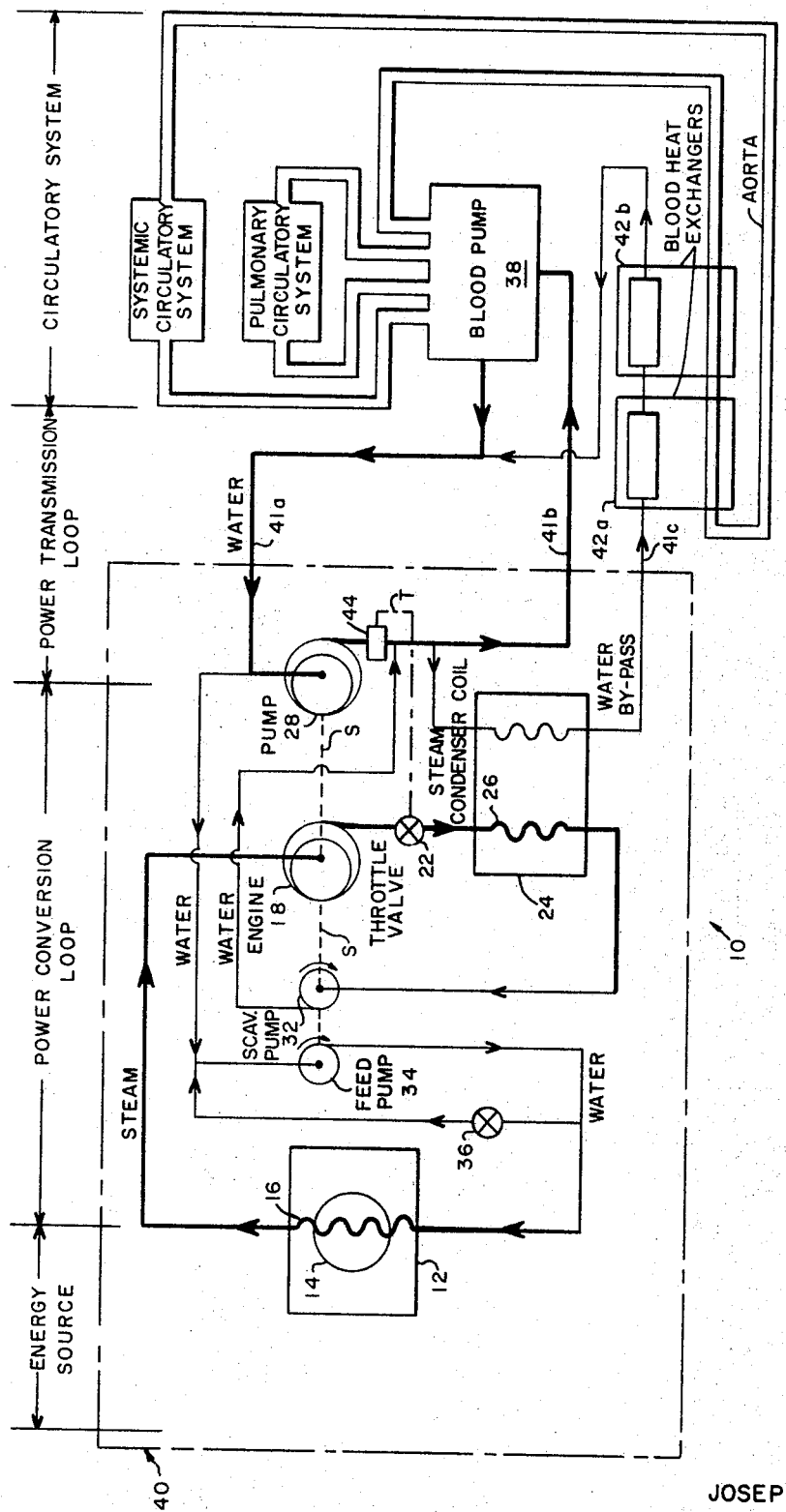
FIG. 1 illustrates schematically the functional elements of a system made in accordance with this invention.

Referring to FIG. 1, circulatory support system 10 embodying this invention consists of an energy source, a power conversion loop, a power transmission loop, and the circulatory system. The energy source includes steam generator 12 containing an isotopic heat source 14 and steam generation coil 16. The power conversion loop includes a steam engine 18, throttle valve 22, steam condenser 24 (containing condensing coil 26), rotary power pump 28, scavenge pump 32, feedwater pump 34, and metering valve 36. The power transmission loop includes pump 28 also and a hydraulic arrangement for driving replacement blood pump 38 in the circulatory system as well as accomplishing other purposes to be described. The energy source and power conversion loop are contained within a compact power unit 40 shown in phantom from which water lines 41a, 41b, and 41c extend.

As indicated by line S in phantom, engine 18 drives directly pumps 28, 32, and 34, the latter of which supplies the feedwater supply for steam generator 12. Metering valve 36 located across pump 34 permits, as will be further described below, initial adjustment and/or long term trim control over the steam flow rate in the power conversion loop.

Water, which functions as the power conversion medium, functions also as the heat transport medium and thermal buffer in the rejection of unused heat of the system and also as the medium of transferring drive from steam engine 18 to blood pump 38. Rotary pump 28 produces high pressure water which is passed in parallel paths through (1) condenser 24 to receive the heat of condensation of water in condenser coil 26 and a pair of blood heat exchangers 42a and 42b to transfer the heat to the blood supply of the individual at the aorta, and (2) through blood pump 38 where the blood is pumped into the pulmonary and systemic circulatory systems as known in the art. Flow through path (1) constitutes about 3% of the total flow.

The parallel flows of water just described are reunited at the outlet of blood pump 38, where some of this water is bypassed directly to feed-water pump 34. Makeup of the bypassed water appears in the outlet of rotary pump 28 where water is inserted from the outlet of scavenge pump 32, which, as already noted, is supplied from steam condenser coil 26.

From the described arrangement it is seen that the power conversion and power transmission loops are interconnected. This is an important aspect of the invention because it permits the power transmission loop which contains far more water (i.e., above 99% of the total water) than does the power conversion loop to act as a make-up system for the latter, and also to maintain water in the transmission loop at a relatively low temperature. This arrangement makes it feasible to avoid extensive sealing arrangements for the power conversion loop, as the transmission loop is able to maintain the conversion loop full with water.

The outlet of rotary pump 28 is provided with a venturi type control device 44 which measures water flow rate and is coupled as shown by phantom line T to alter throttle valve 22 to maintain the desired water flow rate which may be a constant value or a programmed rate dependent on activity and other factors understood in the art. If an increase in exercise level occurs, peripheral resistance of the vascular system will decrease which will cause a related drop in the hydraulic transmission loop resistance seen by rotary pump 28. Since the power level of steam engine 18 is constant, a drop in the resistance seen by pump 28 will result in an increase in engine pump speed and a corresponding increase in pump flow rate. Increased venturi pressure drop caused by the increased flow rate is used to open steam engine throttle valve 22, increasing the engine power output until a new stable operating point at the higher exercise level is reached. This control system reacts in a similar manner when a reduction in exercise level occurs, slaving the engine power output to the load line of the vascular system. Metering valve 36 is normally opened slightly to permit some bypass of water across feedwater pump 34 for the reason that the components including the heat source are oversized in capacity in relation to the requirements of the system. Metering valve 36 is set manually during the initial start-up of the system and is used to compensate for long term decay of the isotope heat source, although for most applications, only the initial adjustment of valve 36 will be required.

Blood pump 38 is of the flexible diaphragm or sac type two-ventricle design supplying the systemic and pulmonary circulatory systems. The aorta, which supplies blood to the systemic circulatory system, is provided with blood heat exchangers 42a and 42b as already noted and which will be more particularly described below.

Figure 2:
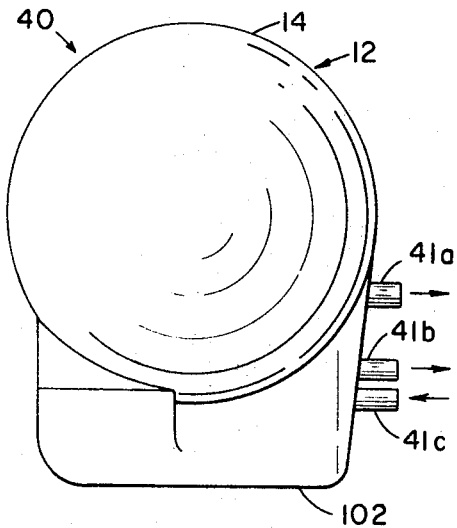
FIG. 2 is an elevation view of the power unit.
Figure 3:
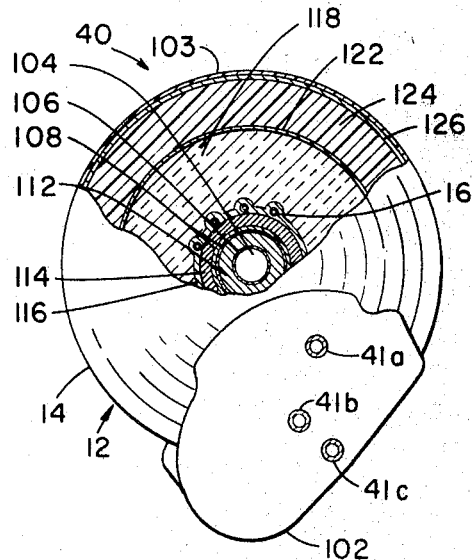
FIG. 3 is a side view in partial section of the unit of FIG. 2.

Referring to FIGS. 2 and 3 for details of steam generator 12, it is seen that the latter consists of a hemispherical heat source 14 and a housing 102 which are enclosed in a medical grade silicone elastomer covering 103. As shown in the sectioned portion, source 14 consists of concentric layers beginning with a central void 104 formed by an inner porous tantalum shell 106 which together with outer tantalum shell 108 sandwiches the isotopic material 112 which is the source of heat. Shell 108 is surrounded by a nuclear radiation shield 114, a copper shell 116 and suitable thermal insulation 118. An additional material, the heat of fusion of which is used for thermal energy storage, such as lithium hydride, may also be incorporated between shield 114 and copper shell 116. A stainless steel layer 122 is then provided around which is neutron shielding material 124, such as borated polyethylene, and an outer stainless steel wall 126 around which is covering 103. Copper shell 116 contains embedded therein a single pass of steam generation coil 16 in which the water is flashed to steam prior to leaving generator 12.

A suitable choice for isotopic material 112 is highly purified plutonium 238 in the metallic form. As this isotope is an alpha emitter, helium is formed as the isotope decays. Hence, void 104 formed by the porous tantalum shell 106 acts to prevent excessive internal pressure as the helium concentration builds up. Outer tantalum shell 108 encapsulates the isotopic material. Isotopic sources of heat such as the one just described are known in the art and are suitable for use in application where long term heat generation with little or no care is required.

Figure 4:
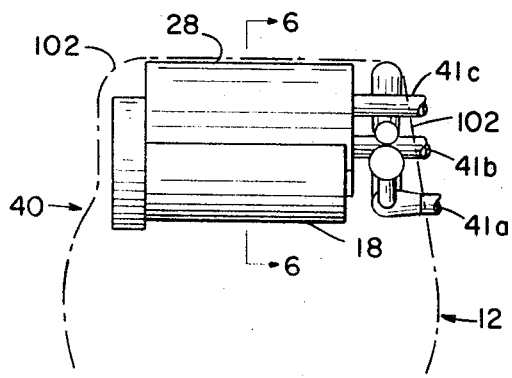
FIG. 4 is an inverted view inside the engine pump housing.

Housing 102 contains previously identified feed pump 34, scavenge pump 32, engine 18, and pump 28. As seen in FIG. 4, engine 18 and pump 28 are mounted side by side while smaller pumps 32 and 34 would be fitted into housing 102 where convenient for direct drive from engine 18. Thus it is apparent that the energy source and the power conversion loop are combined into power unit 40 which is a compact unitary structure. Power unit 40 containing the energy source and the power conversion loop as shown in FIG. 1 is a compact structure which in terms of volume occupies no more than about 1720 cc. and weighs no more than about 2470 grams. This is made possible by the design of the major components engine 18 and pump 28 which being of rotary piston design are capable of great miniaturization and compactness even though each is of multi-cylinder (e.g., four cylinder) construction.

Figure 5:
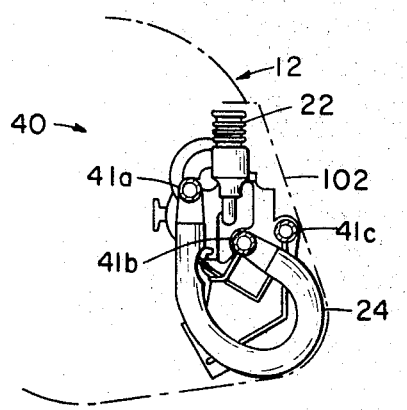
FIG. 5 is a side view inside the engine pump housing.
Figure 6:
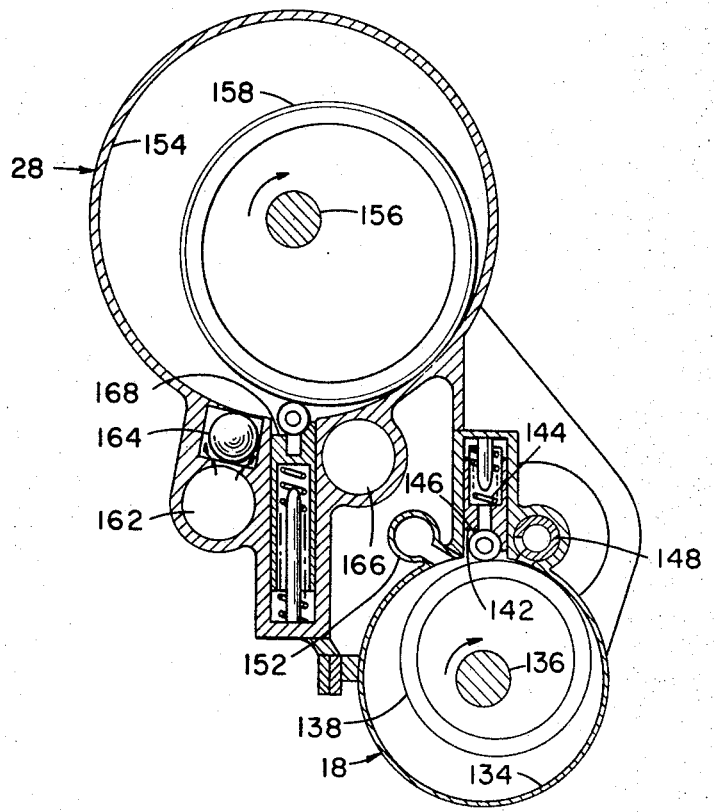
FIG. 6 is a view along 6—6 of FIG. 4.

For details of engine 18 and pump 28, reference is made to FIGS. 4, 5, and 6. Engine 18 and pump 28 are multi-cylinder, in this embodiment, each consisting of four cylinders in a row. From FIG. 6, it will be seen that a typical cylinder 134 in engine 18 through which power shaft 136 extends at the center thereof, has mounted on the latter for rotation therewith an eccentric rotor 138 which at its point of greatest eccentricity sweeps closely the inside surface of cylinder 134. A curtain valve 142 biased by spring 144 urges wheel 146 of valve 142 against the outer surface of roller 138. Wheel 146 and valve 142 are designed to provide a seal along the axis of movement of valve 142 down to the surface of roller 138. Inlet manifold and rotary valve 148 supply steam to the right of curtain valve 142 as shown while an exhaust manifold 152 permits exhaust of the steam after expansion. Rotary valve 148 is driven from the engine shaft by a suitable chain or toothed-belt or gear drive (not shown). As roller 138 rotates in the direction of the arrow shown, an unbalanced force on eccentrically mounted roller 138 due to steam pressure cyclically maintains the rotation of roller 138, this operation of rotating piston engines well known in the art. The remaining cylinders (not shown) function in a similar fashion with the rotors staggered in phase to obtain a uniform generation of power to shaft 136.

Pump 28 is similar in construction. Cylinder 154 contains a shaft 156 on which is mounted eccentrically a roller 158. Inlet manifold 162 delivers water through a ball valve 164 while the high pressure water leaves through outlet manifold 166. Curtain valve 168 operates in similar fashion to curtain valve 142 in engine 18. Shaft 156 is driven directly by power shaft 136 of engine 18 by a suitable drive such as a belt or gear and chain drive (not shown). The pump-motor combination just described thus converts the energy of steam into shaft power and water under pressure to be used as described to actuate blood pump 38 and for the other purposes noted in connection with FIG. 1. Smaller pumps 32 and 34 which are not shown in detail are of conventional design and are mounted within the same housing as engine 18 and pump 28 so that they can be driven also directly from power shaft 136 of engine 18. Referring to FIGS. 4 and 5, the disposition of condenser 24, and throttle valve 22 within power unit 40 are illustrated. Scavenge and feedwater pumps 32 and 34, respectively, although not shown, are placed where convenient within the same housing.

Figure 7:
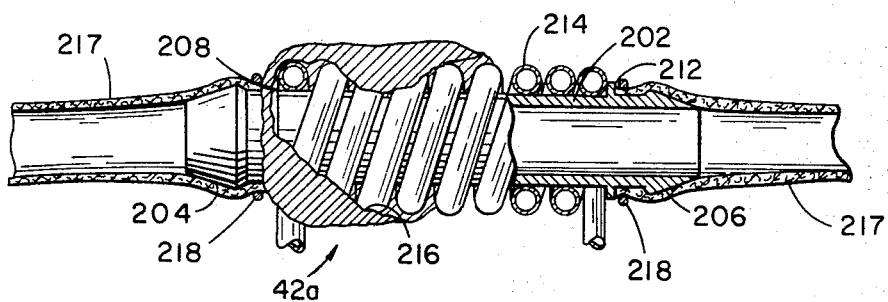
FIG. 7 is a partially sectioned view of a water to blood heat exchanger.

For details of blood heat exchangers 42a and 42b, which are identical in design, reference is made to FIG. 7 wherein heat exchanger 42a is seen to consist of a tubular section 202 to replace a section of the aorta. Tubular section 202 is provided with ends 204 and 206 for grafting into the exposed ends of the aorta, and a pair of lips 208 and 212 between which tubing 214 is accommodated as illustrated. The ends 217 of the aorta are held by sutures 218 to ends 204 and 206. The voids in and around tubing 214 and tubular section 202 are filled with silver solder 216 for improved heat transfer characteristics and the whole assembly is coated with a medical grade silicone elastomer material to assure compatibility of the implanted heat exchanger with surrounding tissue. Tubular section 202 is made from stainless steel coated internally with suitable material to prevent thrombosis. Tubing 214 is also made from stainless steel and is metallurgically joined to section 202. Any antithrombogenic materials or techniques known in the art may be used. Heat exchangers 42a and 42b are in separate sections to facilitate splicing into the aorta with minimum disruption of arterial branches.

In the implanted use of the apparatus just described, power unit 40 would be placed within the abdominal region of the recipient, heat exchangers 42a and 42b would replace sections of the aorta, and blood pump 38 would replace the recipient's heart. The three units just mentioned would be interconnected by a suitable flexible tubing made from a medical grade silicone elastomer plastic. Power unit 40 would be either free floating, or if desired, anchored to the bone structure.

The apparatus as described may be also used as a temporary heart replacement during a heart surgery procedure in which case the system would be external to the donee. Heat changers 42a and 42b would reject heat to a coolant instead of blood and tubing would extend into the chest of the receipient to make connection with the blood vessels.

The following table shows a typical overall system energy balance for the system described:

TABLE 1

| | Watts |
|---|---|
| Isotope source | 42.2 |
| Engine input | 41.1 |
| Engine shaft power | 7.25 |
| Rotary pump input | 7.00 |
| Blood pump input | 4.4 |
| Blood hydraulic power | 3.74 |

Overall system efficiency—8.3%.

The differences in power in each stage represent thermal and mechanical losses. It is readily apparent that the system must be capable of rejecting, for the particular example shown, 38.46 watts to the blood. This value is well within the capabilities of the human being but as already noted it must be accomplished within narrow temperature limits at the blood interface of the water to blood heat exchangers.

As already noted, this is made capable of accomplishment by utilizing a power source and conversion system operating at comparatively low peak temperatures. The maximum peak steam temperature is 550° F. while the condensing temperature is fixed at 150° F. The condensate, it has been noted, is pumped by scavenge pump 32 into the power transmission loop as shown in FIG. 1. As the transmission loop contains over 99% of the system water, the condensate temperature will drop immediately, to about the 104° F. temperature of the transmission loop water. In this way it is seen that the transmission loop not only serves as a make-up reservoir for the power conversion loop, but also acts as a thermal buffer to insure that excessive temperatures are not reached within the water-to-blood heat exchangers.

It is readily apparent from the description of FIG. 1 that pressure with the power transmission loop is substantially greater than the pressure downstream of throttle valve 22. For example, condenser pressure is about 3.7 p.s.i.a. while pressure within the power transmission loop is slightly above atmospheric pressure at the outlet of rotary pump 28. Hence, the scavenge pump 32 is needed to dump water to the power transmission loop. This scheme has two advantages. First, the relatively small inventory of water in the power conversion loop will not be depleted over long term operating periods because the power transmission loop serves as a large reservoir. Second, because of the large difference in steam and rotary pump flow rates, the condensate temperature can vary over a wide range with a negligible resulting change in the power transmission loop water temperature. The heat transfer buffer fluid action of the power transmission loop water is important in that it permits operation of the rotary steam engine over a wide range of power levels (i.e., changing condensing temperatures) without altering significantly the blood heat exchanger interface temperature.

Some representative flow rates are shown in the following table:

TABLE II

| | Lbs./min. |
|---|---|
| Rotary pump 28 | 50.0 |
| Blood through aorta | 13.7 |
| Water through heat exchangers 42a and 42b | 1.43 |
| Steam flow | $2.74 + 10^{-3}$ |

The preceding table shows that the steam mass flow rate in the power conversion loop is approximately 20,000 times smaller than the water mass flow rate in the power transmission loop for the particular example.

It is thus seen that there has been provided a circulatory support system capable of either impranted or external use when it is desired to relieve the heart of its pumping functions.

While only a preferred embodiment has been described, it is understood that the invention is defined by the scope of the appended claims.

We claim:
1. A blood circulatory support system for use with the circulatory system of a living organism comprising:
   (a) self-contained energy source means consisting of an isotopic source of heat and a flash boiler for producing vapor;
   (b) power conversion loop means actuated by said vapor for producing liquid under pressure, said liquid being the condensed state of said vapor, said power conversion loop means including a vapor engine actuated by vapor from said energy source means, a power pump driven by said engine for producing said high pressure liquid, and condenser means for utilizing said liquid under pressure for condensing the exhaust vapor from said vapor engine;
   (c) blood pump means actuated by said liquid under pressure for circulating said blood, said blood pump means having blood inlet and outlet means adapted to be connected to the pulmonary and systemic circulatory systems of said living organism;
   (d) means for rejecting heat from said energy source and power conversion loop means; and
   (e) a scavenge pump which inserts the condensate from said condenser means into the outlet of said power pump and a feedwater pump which withdraws a portion of the inlet liquid to said power pump and inserts same into said flash boiler for the generation of vapor, said liquid under pressure thereby acting as a large liquid reservoir for said power conversion loop means.

2. The circulatory system of claim 1 having means responsive to demands on said blood pump means to regulate output of said power conversion loop means.

3. The circulatory system of claim 2 having means for permitting increase of output of said system to compensate for long term decay of said energy source means.

4. The support system of claim 3 in which the heat rejecting means includes means to reject the heat to said blood.

5. The circulatory system of claim 4 in which said energy source means and said power conversion loop means are combined into a compact unitary structure.

6. The circulatory system of claim 5 in which said liquid is water and said vapor is steam.

7. The support system of claim 4 in which the heat rejecting means consists of a heat exchanger having means adapted to be grafted into a major blood vessel of said organism and a portion of the high pressure liquid from said power pump means transfers heat from said condenser means to said heat exchanger wherein the heat is rejected to the blood in said major blood vessel passing through said heat exchanger.

8. A blood circulatory support system for use with the circulatory system of a living organism comprising:
   (a) self-contained energy source means for producing vapor;
   (b) power conversion loop means actuated by said vapor for producing mechanical power;
   (c) power transmission loop means actuated by said mechanical power for producing liquid under pressure, said liquid being the condensed state of said vapor;
   (d) blood pump means actuated by said liquid under pressure for circulating said blood, said blood pump means having blood inlet and outlet means adapted to be connected to the pulmonary and systemic circulatory systems of said living organism;
   (e) means bypassing a portion of said liquid from said blood pump means for extracting heat from said power conversion loop means; and
   (f) means for rejecting heat from said energy source means and said power conversion loop means into the circulating blood of said organism including a heat exchanger receiving the aforesaid by-passed liquid having means adapted to be grafted into a major blood vessel of said organism for transferring heat directly from the by-passed liquid to the blood flowing in said major blood vessel.

References Cited

UNITED STATES PATENTS 3,379,191  4/1968  Harvey _____ 3—1
3,434,162  3/1969  Wolfe _____ 3—1

RICHARD A. GAUDET, Primary Examiner

R. L. FRINKS, Assistant Examiner

U.S. Cl. X.R.

128—1; 60—25, 203, 95